United States Patent [19]
McCloskey et al.

[11] Patent Number: 5,863,992
[45] Date of Patent: Jan. 26, 1999

[54] TETRAPHENOLS AND THEIR USE AS POLYCARBONATE BRANCHING AGENTS

[75] Inventors: Patrick Joseph McCloskey, Watervliet; David Michel Dardaris, Ballston Spa, both of N.Y.; YeGang Lin; Pin-Pin Wu, both of Evansville, Ind.; Jimmy Lynn Webb, Ballston Lake, N.Y.

[73] Assignee: General Electric Company, Schenectady, N.Y.

[21] Appl. No.: 768,870

[22] Filed: Dec. 17, 1996

Related U.S. Application Data

[60] Provisional application No. 60/021,749, Jul. 15, 1996.

[51] Int. Cl.$^6$ .............................. C08G 64/06; C08G 64/42
[52] U.S. Cl. ............................ 525/469; 525/462; 528/199; 528/204
[58] Field of Search .................................... 525/462, 469; 528/199, 204

[56] References Cited

U.S. PATENT DOCUMENTS

| Re. 27,682 | 6/1973 | Schnell et al. | |
|---|---|---|---|
| 4,415,725 | 11/1983 | Hedges et al. | |
| 5,021,521 | 6/1991 | Krabbenhoft et al. | |
| 5,288,838 | 2/1994 | Sivaram | 528/199 |
| 5,418,316 | 5/1995 | Kuhling | 528/199 |

FOREIGN PATENT DOCUMENTS

| 5314250 | 12/1978 | Japan . |
| 199906 | 7/1967 | U.S.S.R. . |

*Primary Examiner*—David Buttner
*Attorney, Agent, or Firm*—Noreen C. Johnson; Douglas E. Stoner

[57] ABSTRACT

Branched polycarbonates having properties suitable for blow molding are prepared by equilibrating a linear or branched aromatic polycarbonate with certain tetraphenols, especially 2,2,5,5-tetrakis (4-hydroxyphenyl)hexane and [1,1-bis(p-hydroxyphenyl)ethyl]-phenyl ether.

13 Claims, No Drawings

TETRAPHENOLS AND THEIR USE AS POLYCARBONATE BRANCHING AGENTS

CROSS REFERENCE TO RELATED APPLICATION

This application claims priority from provisional application Ser. No. 60/021,749, filed Jul. 15, 1996.

BACKGROUND OF THE INVENTION

This invention relates to the preparation of branched polycarbonates and to reagents suitable for use therein.

Branched polycarbonates are becoming of increasing importance for many purposes, especially in blow molding operations as exemplified by the fabrication of water bottles. Their non-Newtonian properties are extremely important under blow molding conditions. Branched polycarbonates useful for this purpose are typically prepared by the incorporation of a hydroxyaromatic compound having more than two hydroxy groups into a conventional polycarbonate-forming reaction mixture.

Thus, U.S. Reissue Pat. No. 27,682 describes the preparation of branched polycarbonates in a conventional interfacial reaction or from chloroformates. U.S. Pat. No. 4,415,725 describes a similar method which may employ a carbonyl halide such as phosgene (as in the interfacial procedure), a haloformate or a diarylcarbonate. U.S. Pat. No. 5,021,521 describes the preparation of branched polycarbonates by reactive extrusion of a linear or branched polycarbonate with a branching agent of the type described above.

Many of the branching agents considered useful for the preparation of branched polycarbonates are trisphenols. The most common of these is 1,1,1-tris(4-hydroxyphenyl) ethane. Others are disclosed in the aforementioned patents with particular reference to Re Pat. No. 27,682.

It has been found, however, that the branched polycarbonates obtained from trisphenols in a reactive extrusion procedure do not have optimum viscosity characteristics for blow molding. The key properties for this purpose are a relatively low viscosity during high shear melt mixing such as extrusion, and a high viscosity under low shear conditions such as those encountered by a parison before and during blow molding.

The melt strengths and melt viscosities of trisphenol-branched polycarbonates prepared by equilibration are too low to permit their fabrication into parisons. Only by the employment of very high molecular weight polycarbonates, such as those having weight average molecular weights greater than 175,000 relative to polystyrene, is it possible to produce branched products which even approach the desired blow molding properties in viscosity characteristics at low shear.

It has been thought that the use of tetraphenols rather than trisphenols in reactive extrusion processes might improve the viscosity characteristics of the branched products. However, many of the tetraphenols disclosed as useful for this purpose in the art previously identified have serious disadvantages. These include the presence of benzylic hydrogen atoms, which decrease their thermal and oxidative stability; the presence of ortho-substitution, which decreases reactivity; and a characteristic bright color due to a high degree of conjugation, which carries over into the polymeric product and makes it unattractive for use.

The search continues, therefore, for tetraphenolic branching agents which afford polycarbonates with the desired viscosity characteristics and which do not suffer from other serious deficiencies.

SUMMARY OF THE INVENTION

In one of its aspects, the invention is a method for producing a branched polycarbonate which comprises contacting a linear or branched aromatic polycarbonate, in the presence of a carbonate equilibration catalyst, with a tetraphenol of the formula

wherein $R^1$ is $C_{1-4}$ primary alkyl, Z is $C_{1-4}$ alkylene or $-A^2-Q-A^2-$, each of $A^1$ and $A^2$ is an unsubstituted or substituted p-phenylene radical and Q is a single bond or a divalent linking group.

Another aspect is a branched polycarbonate comprising branching structural units of the formula

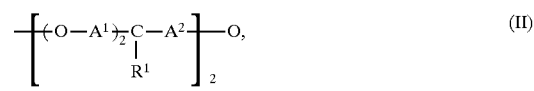

wherein each of $A^1$ and $A^2$ is an unsubstituted or substituted p-phenylene radical and $R^1$ is $C_{1-4}$ primary alkyl.

Still another aspect is tetraphenols of the formula

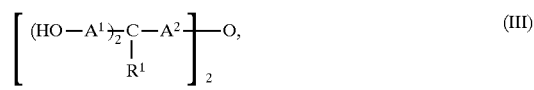

wherein $A^1$, $A^2$ and $R^1$ is $C_{1-4}$ are as previously defined.

DETAILED DESCRIPTION

Preferred Embodiments

The tetraphenols used to prepare branched polycarbonates by reactive extrusion, in accordance with the method of this invention, have formula I in which each of $A^1$ and $A^2$ is an unsubstituted or substituted p-phenylene radical. Typical substituents on the substituted radicals are halogen and especially chlorine atoms and alkyl groups, normally $C_{1-4}$ primary alkyl groups and especially methyl. The preferred compounds, however, are those in which Al and $A^2$ are unsubstituted.

The $R^1$ radicals are also primary alkyl. Most often, they are methyl or ethyl and especially methyl.

The Z radical may be a $C_{1-4}$ alkylene radical or a bisphenol-derived radical of the formula $-A^2-Q-A^2-$. Q may be a single bond or a linking group such as oxygen, sulfur, $SO_2$, methylene or ethylene.

Various compounds of formula I in which Z is alkylene are known, being disclosed, for example, in the aforementioned U.S. Pat. No. 4,415,725. The preferred compound of this type is 2,2,5,5-tetrakis(4-hydroxyphenyl)hexane, in which $A^1$ is unsubstituted phenylene, $R^1$ is methyl and Z is ethylene.

The compounds of formula I in which Z is a bisphenol-derived radical are novel compounds. They may be prepared by the acylation of a compound of the formula $HA^2-Q-A^2H$ under Friedel-Crafts conditions to yield a 4,4'-diacylated compound, which may then undergo reaction with a phenol of the formula $HA^1OH$. The second of these reactions is similar to the reaction of phenol with acetone to produce 2,2-bis(4-hydroxyphenyl) propane, also known as "bisphenol A". The acylation reaction is carried out under typical Friedel-Crafts conditions as disclosed, for example, in Soviet Union Patent 643,492.

The preparation of the novel tetraphenols of this invention is illustrated by the following example.

EXAMPLE 1

A 500-ml three-necked flask equipped with a 100-ml addition funnel having an equalizer side arm and an overhead mechanical stirrer was charged with 65 g (500 mmol) of aluminum chloride and 170 ml of 1,2-dichloroethane. The resulting slurry was cooled to 20° C. under nitrogen and stirred while 17 g (100 mmol) of phenyl ether was added dropwise over several minutes, whereupon the slurry turned orange in color. Acetic anhydride, 24 g (240 mmol), was then added dropwise over 1 hour with continued stirring, while the temperature was maintained at about 20° C. The resulting purple solution was stirred for an additional 30 minutes while warming to room temperature, and was poured over ice. The organic phase was separated and washed with water, 2% aqueous sodium hydroxide solution and water, and was dried over magnesium sulfate. Upon filtration, concentration and purification by recrystallization from ethanol, the desired 4-acetylphenyl ether was obtained in 94% yield.

A 100-ml three-necked flask equipped with an overhead stirrer was charged with 57 g (610 mmol) of phenol, 7.7 g (300 mmol) of 4-acetylphenyl ether, 4.3 g (310 mmol) of boron trifluoride-ethyl ether complex and 280 mg of 3-mercaptopropionic acid. The mixture was heated under vacuum (about 20 torr) at 55° C. for 8 hours, with stirring, after which the reaction was shown by liquid chromatography to be about 85% complete. Stirring under vacuum was continued for 14 hours.

The reaction mixture was poured into water and ethyl acetate was added. The organic layer was separated, washed with water, saturated aqueous sodium bicarbonate solution, 1% aqueous hydrochloric acid solution and water. The organic phase was separated and most of the unreacted phenol was removed by vacuum stripping, after which the residue was redissolved in ethyl acetate and stirred with 200 ml of 5% aqueous sodium hydroxide solution, resulting in precipitation of the sodium salt of the tetraphenol. The salt was collected by filtration, reslurried in water, acidified and extracted again with ethylacetate. The organic extracts were dried over magnesium sulfate and concentrated to yield a light brown gum, which was crystallized from a chloroform-acetonitrile mixture. The product was 11.2 grams (75% of theoretical) of an off-white solid. Recrystallization from an acetone-hexane mixture yielded the desired pure [1,1-bis(p-hydroxyphenyl)ethyl]phenyl ether having a melting point of 172°–174° C.

The aromatic polycarbonates employed in the branched polycarbonate preparation method of this invention generally comprise structural units of the formula

(IV)

wherein $R^2$ is an aromatic organic radical. Preferably, $R^2$ is an aromatic organic radical and still more preferably a radical of the formula:

(V)

wherein each of $A^3$ and $A^4$ is a monocyclic divalent aryl radical and Y is a bridging radical in which one or two carbon atoms separate $A^3$ and $A^4$. Such radicals frequently are derived from dihydroxyaromatic compounds of the formula $HO-A^3-Y-A^4-OH$. For example, $A^3$ and $A^4$ typically represent unsubstituted phenylene or substituted derivatives thereof. The bridging radical Y is most often a hydrocarbon group and particularly a saturated group such as methylene, cyclohexylidene or isopropylidene. The most preferred dihydroxyaromatic compound is bisphenol A, in which each of $A^3$ and $A^4$ is p-phenylene and Y is isopropylidene.

Previously branched polycarbonates may be employed in place of or in admixture with the linear polycarbonates. Such previously branched polycarbonates may be prepared as described earlier, using trisphenols or tetraphenols as branching agents in interfacial, melt or reactive extrusion polycarbonate-forming reactions.

As carbonate equilibration catalysts, various bases and Lewis acids may be employed. Numerous compounds suitable for this purpose are disclosed in the aforementioned U.S. Pat. No. 5,021,521, the disclosure of which is incorporated by reference herein. Of those compounds, the ones preferred in most instances are the tetraphenylborate salts, and especially the quaternary ammonium and quaternary phosphonium tetraphenylborates.

It is frequently more preferred, however, to employ catalysts more readily susceptible than the tetraphenylborates to decomposition under reactive exclusion conditions, so that residues which may promote degradation and discoloration do not remain in the polycarbonate. A class of compounds which meet this requirement is the genus of quaternary bisphenolates having the molecular formula

(VI)

wherein $A^5$ is unsubstituted p-phenylene, Q is a monocationic carbon- and nitrogen-containing moiety containing 9–34 atoms and Y is as previously defined. Such compounds are disclosed and claimed in copending, commonly owned application Ser. No. 08/768,871. Now U.S. Pat. No. 5,756,843

The Q radical in the quaternary bisphenolates of formula VI is a monocationic carbon- and nitrogen-containing moiety; i.e., a moiety having a single positive charge. It may be a tetraalkylammonium moiety wherein the alkyl groups contain 2–5 carbon atoms, as illustrated by tetraethylammonium, tetra-n-butylammonium and diethyldi-n-butylammonium. Preferably, however, it is a hexaalkylguanidinium moiety such as hexaaethylguanidinium, hexa-n-butylguanidinium or tetraethyldi-n-butylguanidinium. The atom content of 9–34 atoms includes both carbon and nitrogen atoms and its size is governed by the fact that the tetraethylammonium cation contains 8 carbon atoms and one nitrogen atom for a total of 9, while the hexapentylguanidinium cation contains 31 carbon atoms and 3 nitrogen atoms for a total of 34.

Quaternary bisphenolates of formula VI may be prepared by the reaction of a bisphenol of the formula $(HOA^5)_2Y$ with an alkali metal hydroxide and a quaternary salt of the formula $Q^+X^-$. The X value in the quaternary salt is halide, preferably bromide or chloride and most preferably chloride. Typical reaction temperatures are in the range of about 10°–125° and preferably about 10°–50° C. An inert atmosphere such as nitrogen or argon may be employed.

The quaternary bisphenolate-forming reaction takes place in an aqueous medium, most often also containing a $C_{1-3}$ alkanol and preferably methanol. The quaternary bisphenolate is usually insoluble in water but soluble in the alkanol, and can be isolated by precipitation with an excess of water.

It is generally found convenient to initially form an alcoholic mixture of bisphenol and alkali metal hydroxide, whereupon the bisphenol dissolves as the alkali metal salt, and to add thereto an aqueous-alcoholic solution of the quaternary salt. Another alternative is to combine the bisphenol and quaternary salt and gradually add aqueous alkali metal hydroxide solution thereto. In the water-alkanol embodiment, ambient temperatures in the range of about 20°–30° C. are generally preferred In still another procedure, a non-polar organic solvent such as toluene is employed. An aqueous alkaline solution of the quaternary salt is added gradually to a combination of the bisphenol and refluxing solvent. The product precipitates out and can be purified by washing with water. Further purification of product obtained by any of these methods can be achieved by recrystallization, most often from an alkanol and preferably methanol.

Reactant proportions are not critical in the method for preparing the quaternary bisphenolates. This is apparent from the fact that their formation was initially discovered in mixtures comprising the non-stoichiometric proportions of 2 moles of alkali metal hydroxide, 2 moles of hexaalkylguanidinium chloride and 1 mole of bisphenol. For optimum yield, however, a bisphenol:quaternary salt:alkali metal hydroxide molar ratio of 1:2:0.5–1.5 and especially 1:2:1 is preferred.

The preparation of quaternary bisphenolates is illustrated by the following examples. "Catalyst solution" in this example is an aqueous solution of 28.54% (by weight) hexaethylguanidinium chloride and 10.09% sodium chloride.

EXAMPLE 2

A 5-l round-bottomed flask was purged with nitrogen and charged with 228.29 g (1 mole) of bisphenol A, 20.29 g (0.5 mole) of sodium hydroxide and 300 ml of methanol. The resulting solution was magnetically stirred under nitrogen. A blend of 462.26 g of catalyst solution (0.5 mole of hexaethylguanidinium chloride) and about 175 ml of methanol was added rapidly, whereupon a solid immediately precipitated. Methanol, 900 ml, was added with stirring to redissolve all of the solids.

Stirring was continued for 15 minutes, after which 1100 ml of water was added to reprecipitate the solids. The flask was cooled to 20° C. in ice and vacuum filtered. The filter cake was washed with 1200 ml of water and dried in a vacuum oven at 75° C., yielding 335.44 g (98.1% crude yield) of a white solid. Recrystallization from methanol followed by vacuum drying yielded 244.14 g (71.4% of theoretical) of purified product in the form of colorless crystals with a melting point of 208°–210° C. The purified product was shown by elemental analysis, atomic adsorption analysis and proton nuclear magnetic resonance spectroscopy to be the desired hexaethylguanidinium bisphenolate, having the stoichiometric proportions of three hydrogen atoms, one hexaethylguanidinium cation moiety and two bisphenol A dianion moieties.

The polycarbonate equilibration reaction takes place when an intimate mixture of the linear or branched polycarbonate and the catalyst is heated in the melt, as in a batch melt reactor or an extruder, at temperatures in the range of about 250°–350° C. The proportions of catalyst and branching agent are ordinarily about 10–500 ppm by weight and about 0.1–2.0 mole percent, based on structural units in the polycarbonate, respectively. When the catalyst is a quaternary bisphenolate, it decomposes during the reaction to an olefin, a bisphenol and the relatively volatile pentaalkylguanidine.

The complex viscosity ratio, $R^*$, is an indication of the suitability of a polymer for blow molding. It is defined as the melt viscosity in poise of the polymer at a temperature $T^*$ under low shear conditions of 1 rad/sec, typical of a blow molding parison, divided by 20,000 poise which is the viscosity of said polymer at a high shear rate of 100 rad/sec at $T^*$ and which is assumed to be exemplary of extrusion conditions. $R^*$ is thus a measure of the shear thinning behavior of the polymer. Experience has shown that good blow molding performance is obtained if $R^*$ for a given polymer is approximately equal to or greater than 3.5; $T^*$ for that polymer is or approximates the ideal temperature for creating a parison.

$R^*$ and $T^*$ values as listed hereinafter were obtained by determining melt viscosities on a Rheometrics Dynamic Spectrometer at shear rates of 1 and 100 rad/sec during a heating scan over a range which included $T^*$. Upon plotting viscosity against temperature, the value of $T^*$ was obtained by interpolation as that temperature at which the viscosity is 20,000 poise at 100 rad/sec. Then the viscosity at this temperature and a shear rate of 1 rad/sec was determined by interpolation on the viscosity curve corresponding to that rate. $R^*$ is the viscosity at low shear divided by 20,000 poise.

The preparation of branched polycarbonates by the method of this invention is illustrated by the following examples.

EXAMPLES 3–11

Dry blends of a commercial bisphenol A polycarbonate having a weight average molecular weight of about 66,000 relative to polystrene, as determined by gel permeation chromatography, and various proportions of 2,2,5,5-tetrakis (4-hydroxyphenyl)hexane as a branching agent and tetraethylammonium acetate as an equilibration catalyst were prepared by dry blending and extruded on a twin screw extruder at temperatures of about 280° C., with vacuum venting. The values of $R^*$ and $T^*$ were determined and compared with those for two controls: Control 1 which was the reactant polycarbonate, and Control 2 which was an extruded blend of the reactant polycarbonate with tetraethylammonium acetate only. The results are provided in

TABLE I

| Example | Tetraphenol, mole % | Catalyst, ppm | $R^*$ | $T^*$ |
|---|---|---|---|---|
| 3 | 0.20 | 100 | 3.14 | 265 |
| 4 | 0.30 | 100 | 3.40 | 267 |
| 5 | 0.40 | 100 | 3.80 | 267 |
| 6 | 0.20 | 200 | 2.66 | 261 |
| 7 | 0.30 | 200 | 3.48 | 263 |
| 8 | 0.40 | 200 | 3.68 | 260 |
| 9 | 0.20 | 300 | 2.46 | 261 |
| 10 | 0.30 | 300 | 3.05 | 258 |
| 11 | 0.40 | 300 | 3.46 | 255 |
| Control 1 | — | — | 1.43 | 270 |
| Control 2 | — | 200 | 1.64 | 266 |

It will be seen that numerous products prepared by this method have viscosity properties making them suitable for blow molding. This is in contrast to products formed by branching with 1,1,1-tris(4-hydroxyphenyl)ethane; even employing a reactant polycarbonate with a weight average molecular weight of 180,000, $R^*$ values below 3 were obtained in all instances.

EXAMPLES 12–18

The procedure of Examples 3–11 was repeated, employing the product of Example 1 in the amount of 0.28 mole percent as the branching agent and various compounds as equilibration catalysts. The results are given in Table II.

TABLE II

| Example | Identity | Conc., ppm | R* | T (R*) |
|---|---|---|---|---|
| 12 | Tetra-n-butylammonium tetraphenylborate | 380 | 3.71 | 272 |
| 13 | Tetra-n-butylphosphonium tetraphenylborate | 380 | 3.90 | 277 |
| 14 | Tetra-n-butylammonium borohydride | 29 | 3.20 | 266 |
| 15 | Tetra-n-butylphosphonium acetate | 200 | 3.00 | 253 |
| 16 | Sodium tetraphenylborate | 14 | 3.63 | 266 |
| 17 | Product of Ex. 2 | 64 | 3.55 | 267 |
| 18 | Product of Ex. 2 | 129 | 4.12 | 271 |

Again, it will be seen that many of the products have excellent properties for blow molding. In particular, the products of Examples 17 and 18, prepared using the guanidinium bisphenolate as a catalyst, have extraordinarily good viscosity characteristics. In addition, they are free from catalyst decomposition residues since the catalyst by-products have been removed by volatilization.

What is claimed is:

1. A method for producing a branched polycarbonate which comprises contacting a linear or branched aromatic polycarbonate with a tetraphenol of the formula

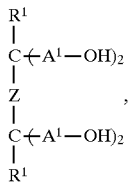
(I)

wherein $R^1$ is $C_{1-4}$ primary alkyl, Z is $C_{1-4}$ alkylene or $-A^2-Q-A^2-$, each of $A^1$ and $A^2$ is an unsubstituted or substituted p-phenylene radical and Q is a single bond or a divalent linking group, said contact being in the presence of a carbonate equilibration catalyst which is a quaternary bisphenolate having the molecular formula $$H_3Q[(OA^5)_2Y]_2, \quad (VI)$$

wherein A5 is unsubstituted p-phenylene, Q is a monocationic carbon- and nitrogen-containing moiety containing 9–34 atoms and Y is a bridging radical in which one or two carbon atoms separate the $A^5$ values.

2. A method according to claim 1 wherein the polycarbonate comprises structural units of the formula

(IV)

wherein $R^2$ is an aromatic organic radical.

3. A method according to claim 2 wherein $R^2$ has the formula

(V)

wherein each of $A^3$ and $A^4$ is a monocyclic divalent aryl radical and Y is a bridging radical in which one or two carbon atoms separate $A^3$ and $A^4$.

4. A method according to claim 1 wherein the polycarbonate is a bisphenol A polycarbonate.

5. A method according to claim 1 wherein $R^1$ is methyl and $A^1$ is unsubstituted p-phenylene.

6. A method according to claim 5 wherein Z is ethylene.

7. A method according to claim 5 wherein Z is $-A^2-O-A^2-$ and $A^2$ is unsubstituted p-phenylene.

8. A method according to claim 1 wherein Q is hexaethylguanidinium, $A^5$ is p-phenylene and Y is isopropylidene.

9. A branched polycarbonate comprising branching structural units of the formula

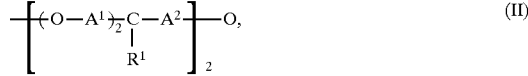
(II)

wherein each of $A^1$ and $A^2$ is an unsubstituted or substituted p-phenylene radical and $R^1$ is $C_{1-4}$ primary alkyl.

10. A polycarbonate according to claim 9 which further comprises structural units of the formula

(IV)

wherein $R^2$ is an aromatic organic radical.

11. A polycarbonate according to claim 10 wherein $R^2$ has the formula

(V)

wherein each of $A^3$ and $A^4$ is a monocyclic divalent aryl radical and Y is a bridging radical in which one or two carbon atoms separate $A^3$ and $A^4$.

12. A polycarbonate according to claim 9 which is a bisphenol A polycarbonate.

13. A polycarbonate according to claim 9 wherein $R^1$ is methyl and $A^1$ is unsubstituted p-phenylene.

* * * * *